United States Patent [19]

Fraser

[11] 3,945,603

[45] Mar. 23, 1976

[54] VALVE PARTICULARLY ADAPTED FOR USE IN VACUUM WORK

[75] Inventor: Douglas S. Fraser, New Paltz, N.Y.

[73] Assignee: FTS Systems Inc., Stone Ridge, N.Y.

[22] Filed: Apr. 17, 1975

[21] Appl. No.: 568,981

[52] U.S. Cl. ............... 251/148; 251/150; 251/309; 251/368; 137/625.24; 285/176
[51] Int. Cl.² ..................... F16K 5/04; F16K 11/00
[58] Field of Search .......... 251/148, 150, 151, 152, 251/309, 310, 311, 312, 366, 368; 137/625.24; 285/DIG. 22, 238, 256, 176; 137/799

[56] References Cited
UNITED STATES PATENTS

| | | | |
|---|---|---|---|
| 694,706 | 3/1902 | Walsh, Jr. | 137/625.64 |
| 2,261,213 | 11/1941 | Bierman | 137/625.64 X |
| 2,507,536 | 5/1950 | Goodson | 285/176 X |
| 2,832,562 | 4/1958 | Myers | 251/368 X |
| 3,185,179 | 5/1965 | Harautuneian | 251/368 X |
| 3,434,691 | 3/1969 | Hamilton | 251/368 X |
| 3,509,909 | 5/1970 | Bender et al. | 137/625.24 X |
| 3,678,960 | 7/1972 | Liebinsohn | 251/309 X |
| 3,783,900 | 1/1974 | Waldbillig | 251/309 X |
| 3,790,132 | 2/1974 | Schmitt | 251/312 |
| 3,895,632 | 7/1975 | Plowiecki | 251/309 X |

Primary Examiner—William R. Cline
Attorney, Agent, or Firm—Robert E. Wagner; Robert E. Browne

[57] ABSTRACT

This invention relates to a vacuum valve having a hollow body formed of a resilient material and a valve means securely positioned at the center of the valve body in a seat integral with the body. The body is divided into two parts, being connected to a vacuum source at one end and an ampule at the other. The valve means alternately closes and opens this connection to the vacuum source in the manner common to valves. The valve further has openings connecting the ampule end of the valve body to the ambient air pressure, allowing release of the ampule without undue turbulence. The body has grooves in its interior walls, two on the ampule side and one on the side of the vacuum source, to enable the valve body to accept different sizes of ampules and connections without deforming and the subsequent loss of vacuum.

5 Claims, 5 Drawing Figures

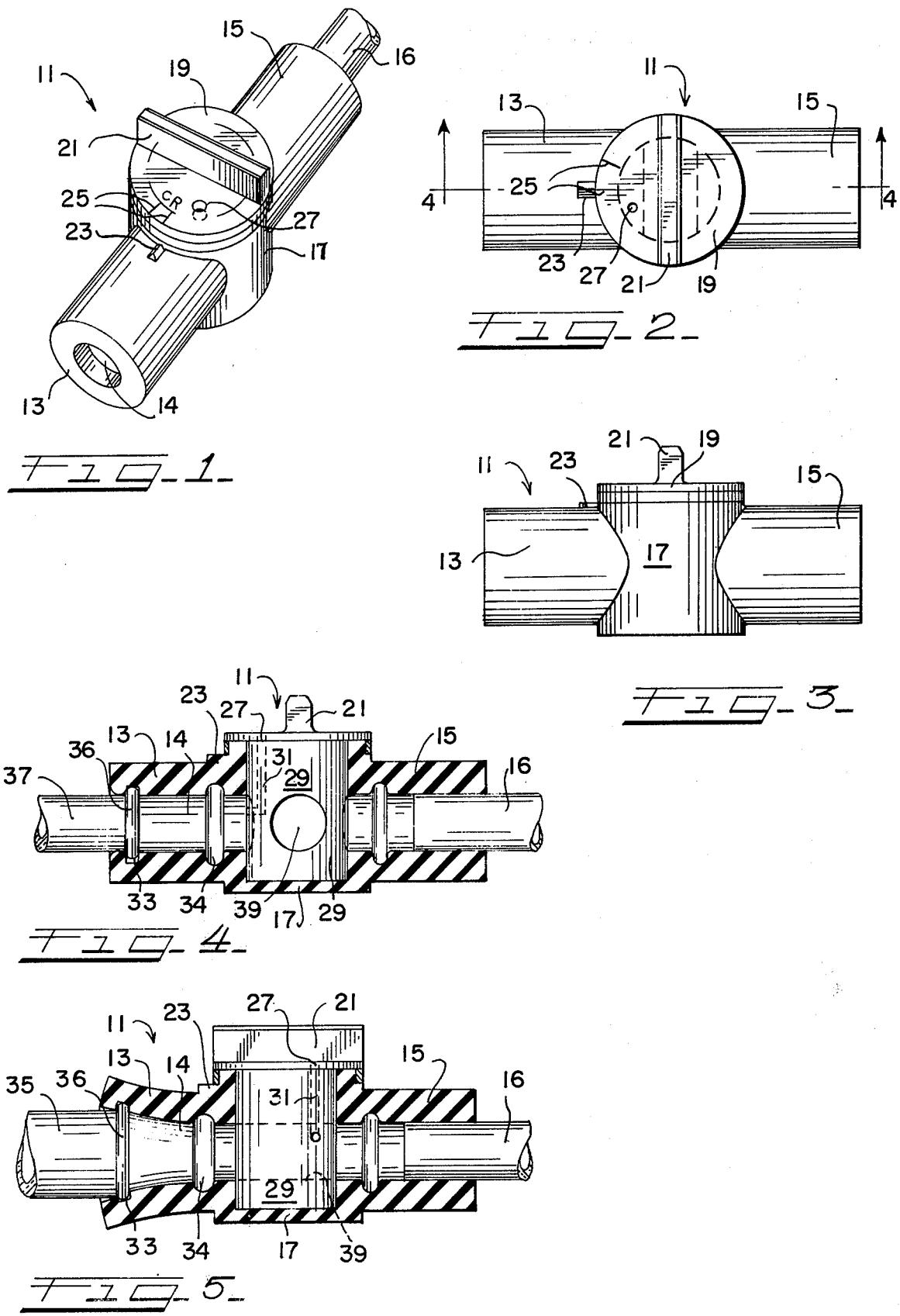

VALVE PARTICULARLY ADAPTED FOR USE IN VACUUM WORK

Description of the Invention

This invention relates to a valve device capable of accepting ampules and other like specimen containers for freeze drying purposes. Freeze drying entails the use of a vacuum, and a valve that will effectively retain this vacuum and then release it gently without undue effort on the part of the operator is a necessary component of a freeze drying system.

While stopcock valves are well known in the art, the present invention is unique in using a combination of a resilient material, preferably a rubber or rubber-like substance, for the body portion of the valve with grooves molded into this material in the interior passageways of the invention. These grooves allow the resilient material to accept different size ampules and connectors from ½ inch to ¾ inch outside diameter (OD) mouths, without deforming or stretching the valve body in such a manner as to cause a loss of vacuum. Prior valve devices without these grooves forced the operator to change the valve every time a different size ampule was used, thus making necessary a supply of valves, each corresponding to a different size ampule.

If one did not change the valve when inserting an ampule of a larger diameter into a valve without these grooves, the result would be a gradual creeping of the ampule off the valve and a subsequent disengagement of the ampule from the valve. If this disengagement is allowed to occur, then the sample is lost through spattering from the sudden loss of vacuum and the possible breakage of the ampule as it falls off the valve.

Previous to this invention, if the operator wished to use a different size ampule having a larger or smaller diameter opening, he had to release the vacuum, remove the incompatible valve, replace it with a properly-sized valve, turn on the vacuum, and then wait until the pressure dropped to an acceptable level. This whole procedure is obviated with the use of the present invention in that the same valve may be used for different size ampules.

Accordingly, it is an object of this invention to allow use of different size ampules without necessitating a change of valves.

Another object of the present invention is to provide a valve which will hold and release a vacuum gently and easily.

Yet another object of the present invention is to allow release of vacuum from the specimen container without also releasing vacuum from the vacuum source.

A still further object of the present invention is to form a vacuum-tight seal around the mouth of different sizes of specimen containers and vacuum connections.

The foregoing and other objects, features and advantages of this invention will be apparent from the following more particular description of embodiments of the invention, as illustrated in the accompanying drawings wherein:

FIG. 1 is a front perspective view of the preferred embodiment of the present invention showing a connection attaching it to a vacuum source (not shown), and showing the stopcock in the R (release) position;

FIG. 2 is a top plan view of the preferred embodiment of the present invention;

FIG. 3 is a side view of the preferred embodiment of the present invention;

FIG. 4 is a cross section of the embodiment of the present invention of FIG. 2 taken along line 4—4 and showing the mouth of a specimen container attached to the left portion of the invention, a connection to the vacuum source (not shown) on the right side, and the stopcock disposed to allow atmospheric pressure into the specimen container; and FIG. 5 is a cross section of the embodiment of the present invention of FIG. 2 also taken along line 4-4 and showing the mouth of a larger diameter specimen container attached to the left portion of the invention, a connection to the vacuum source (not shown) on the right side, and the stopcock disposed to permit entry of vacuum into the specimen container.

Referring more specifically to the preferred embodiment shown in FIG. 1, the valve unit 11 includes two opposing, spaced, cylindrical end portions 13 and 15 disposed in a straight line fashion, one end portion 13 designed to accept ampules or other specimen containers, and the other end portion 15 designed to accept a connector device 16 leading to the vacuum source and, particularly, a nipple-type freeze dryer. These opposing end portions 13 and 15 are integrally connected by another hollow cylinder disposed perpendicular to the end portions 13 and 15, and serving as a stopcock seat or valve seat 17. Securely fitted inside this seat 17 is a stopcock or movable valve member 19 which, as can be better seen in FIG. 4, includes a flange 21 on the top of the valve 19 which serves as a handle for turning the valve to the various positions. The stopcock further includes a stopcock stem 29 which has a passageway 31 which connects the interior passageways 14 of the two end portions 13 and 15 when the valve is in the position shown in FIG. 5. When the valve is in the position shown in FIGS. 2 and 4, the interior passageways 14 of the two end portions 13 and 15 are not connected; however, the interior passageway 14 of the ampule end portion 13, as shown in FIG. 4, is connected to the exterior of the valve by a small duct 31 from the top of the valve and opening within the interior passageway 14, thus forming a means of gently releasing vacuum to the ampule without releasing vacuum from the source also. To retain the vacuum, a position such as that in FIG. 5 is employed. These respective positions of the valve are indicated on the top of the valve by markings 25 accompanied by the letters C and R, for close and release, respectively.

The interior passageways of both end portions 13 and 15 of the preferred embodiment have grooves 32, 33 and 35 molded into the interior walls of these passageways. The groove 33 is of such a width that it will accept the lip 36 of an ampule 35 or 37 and a nipple of a freeze dryer, as shown in FIGS. 4 and 5, and still retain a vacuum. There are two such grooves 33 and 35 on the ampule end portion 13 and one groove 32 on the vacuum source end portion 15. They perform the function of allowing the end portion to accept different sizes of entry connections without deforming the valve seat, and thus maintaining the vacuum. The vacuum source end portion in the preferred embodiment accepts the connection from the freeze dryer. The ampule end portion of the preferred embodiment, however, can accept ampules or other specimen containers having mouths of varying size ranges. FIG. 4 shows an ampule with a roughly ½ inch OD inserted into the end portion 13 of the valve unit and the groove 33 with substantially no deformation and, therefore, no threat of loss of vacuum occurs. In FIG. 5, an ampule of a roughly ¾ inch OD is shown inserted into the end portion 13. Here the outer edge of the end portion is shown deformed. However, while the outer groove 33 serves to maintain a vacuum-tight seal on the ampule mouth, the inner groove 35 prevents the deformity from extending beyond it into the stopcock seat 17 where a possibility of loss of vacuum would present itself were it not for the inner groove 35. In a sense, the inner groove might be said to act as a hinge or a pleat whereby all disruptions or irregularities in shape brought on by the larger sizes of ampules are absorbed and thereby limited to the end portion in front of the groove.

Upon a consideration of the foregoing, it will become obvious to those skilled in the art that various modifications may be made without departing from the invention embodied herein. Therefore, only such limitations should be imposed as are indicated by the spirit and scope of the appended claims.

I claim:

1. A valve assembly particularly adapted for use in vacuum applications such as freeze drying and the like, said valve assembly including a resilient hollow valve body, a first connector means having interior walls forming a first fluid passageway connected to said hollow valve body, a second connector means having interior walls forming a second fluid passageway connected to said hollow valve body, a movable valve member disposed in rotatable fluid-tight relationship within said hollow valve body in such a manner that said valve member is movable to a first or open position to provide line-of-sight transmission of fluids from said first connector means through said valve member to said second connector means, said valve member being movable to a second or closed position wherein said flow of fluids is obstructed, said valve member having means formed therein for communication between the interior of one of said fluid passageways and the ambient surroundings when said valve member is moved to a third or release position thereby to provide for vacuum release, said connector means having grooves formed in said interior walls thereof, a plurality of said grooves being spaced on said interior wall of said first connector means, the outermost of said grooves being adapted to receive and hold vessels of varying size and the innermost of said grooves designed to prevent the deformation of the configuration of said valve body and loss of said fluid-tight seal when vessels of varying size are inserted into said connector means, a plurality of said grooves being formed on said interior walls of said second connector portion, the innermost of which being designed to prevent deformation of said valve body when connectors of varying size are inserted.

2. The vacuum valve assembly of claim 1 wherein the hollow valve body comprises a valve member seat with an open top and a closed bottom and has a rigid band around said open top, thus securing said valve member and preventing deformation of said valve member seat on the application of external force.

3. The vacuum valve assembly of claim 1 wherein said first and second connector means are integrally joined with said valve body to form an integral part of said vacuum valve assembly.

4. The vacuum valve assembly of claim 1 wherein said plurality of grooves spaced on said interior wall of said first connector means include a first groove positioned in said first connector means adjacent said hollow valve body adapted to prevent deformation of said hollow valve body, and a second groove positioned adjacent the outer end of said first connector means adapted to receive and hold a vessel.

5. The vacuum valve assembly of claim 1 wherein said plurality of grooves formed on the interior wall of said second connector means include one groove on the interior wall of said second connector means adjacent the valve means adapted to receive and hold connectors of varying size.

* * * * *